United States Patent [19]
Lane

[11] Patent Number: 5,386,925
[45] Date of Patent: Feb. 7, 1995

[54] EXPANSION TANK

[75] Inventor: Joseph A. Lane, Taunton, Mass.

[73] Assignee: Amtrol Inc., West Warwick, R.I.

[21] Appl. No.: 78,837

[22] Filed: Jun. 21, 1993

[51] Int. Cl.⁶ .............................................. F16L 55/04
[52] U.S. Cl. ....................: ............... 220/530; 220/412;
220/581; 220/721
[58] Field of Search ............. 220/720, 721, 403, 4.06,
220/4.12, 4.21, 581, 461, 530; 138/30

[56] References Cited

U.S. PATENT DOCUMENTS

| | | | |
|---|---|---|---|
| 2,695,753 | 11/1954 | Kirk, Jr. | 237/8 |
| 3,035,614 | 5/1962 | Kirk, Jr. | 138/30 |
| 3,137,317 | 6/1964 | Peters | 138/30 |
| 3,165,229 | 1/1965 | Paul | 220/85 |
| 3,236,411 | 2/1966 | Lander et al. | 220/85 |
| 3,425,593 | 2/1969 | Kramer et al. | 220/721 |
| 3,493,496 | 2/1970 | Bray et al. | 210/23 |
| 3,524,475 | 8/1970 | Kirk, Jr. | 138/30 |
| 3,929,163 | 12/1975 | Schon | 138/30 |
| 3,931,834 | 1/1976 | Caillet | 138/30 |
| 3,948,287 | 4/1976 | Sugimura et al. | 138/30 |
| 3,963,052 | 6/1976 | Mercier | 220/721 |
| 3,963,612 | 6/1976 | Gossett et al. | 210/143 |
| 4,181,156 | 1/1980 | Zahid | 138/30 |
| 4,192,350 | 3/1980 | Mercier | 138/30 |
| 4,299,254 | 11/1981 | Zahid | 138/30 |
| 4,474,215 | 10/1984 | Richter et al. | 138/30 |
| 4,595,037 | 6/1986 | LeBreton et al. | 138/30 |
| 4,667,841 | 5/1987 | Belle | 220/22 |
| 4,784,181 | 11/1988 | Hilverdink | 138/30 |
| 5,062,455 | 11/1991 | Schurter et al. | 138/30 |
| 5,176,178 | 1/1993 | Schurter et al. | 138/30 |

FOREIGN PATENT DOCUMENTS

| | | |
|---|---|---|
| 56-14401 | 4/1981 | Japan . |
| 62-68001 | 4/1987 | Japan . |
| 62-29641 | 6/1987 | Japan . |
| 63-190902 | 8/1988 | Japan . |
| 2-92101 | 7/1990 | Japan . |
| 3-4902 | 1/1991 | Japan . |
| 3-140601 | 6/1991 | Japan . |
| 3-181601 | 8/1991 | Japan . |
| 4-25601 | 1/1992 | Japan . |
| 4-39401 | 4/1992 | Japan . |

Primary Examiner—Allan N. Shoap
Assistant Examiner—S. Castellano
Attorney, Agent, or Firm—Fisher, Christen & Sabol

[57] ABSTRACT

Expansion tanks having a pair of hollow body members. Each hollow body member has an end wall and a tubular side wall having an end portion. The end portions of the side walls are in end to end relation. There is a continuous retaining ring having a first peripheral portion and a second peripheral portion. The end portions of the side walls are united to the first peripheral portion so as to form a tank. The second peripheral portion is located interior to the first peripheral portion. There is also a flexible diaphragm in and spanning the tank and having a peripheral portion in peripheral engagement with the end portion of the side wall of one of the hollow body members. The second peripheral portion of the retaining ring engages and compressingly holds the peripheral portion of the diaphragm in peripheral engagement with the side wall.

2 Claims, 3 Drawing Sheets

EXPANSION TANK

BACKGROUND OF THE INVENTION

1. Field Of The Invention

The invention relates to closed hot water heating systems or pressurized water systems, and more particularly to an expansion tank, forming part of the system, and the construction thereof. Stated otherwise, the invention relates to expansion tanks and, more particularly, to improved expansion tanks adapted to form part of a hot water heating system or a pressurized water system.

2. Prior Art

Water contains air in the absorbed state in nearly inverse proportion to its temperature. This air is liberated into the system when the water is heated and accumulates in the compression tank and other portions of the heating system. A reduction in heating efficiency results, making continuous venting of radiators or convectors necessary. The water as it is heated expands and moves into the compression tank which is connected to the piping through which the water is circulated. When the temperature of the boiler water reaches the desired degree, the firing of the boiler ceases. The water begins to cool and contract. As it cools, that part of the boiler water in direct contact with air in the compression tank absorbs some of the air in the tank. Through thermal circulation this aircharged water in the compression tank is changed continually so that in the next heating cycle this re-absorbed air is liberated into the system. This reversible process is repeated as often as the firing cycle is repeated and the boiler water is heated and cooled. As a result of this process the pressure in the system varies considerably and eventually the system may cease to function.

Expansion tanks in domestic water systems provide an air cushion for the supply water. The air and water in early systems were in direct contact. Air being soluble in water, the water absorbs air. The water in the system might eventually absorb the air cushion in the expansion tanks, leaving a static water system which necessitates the constant operation of a pressure pump. Subsequently an air surge chamber was provided which was not in direct contact with the water, thereby eliminating the need of the pressure pump operating every time a faucet was turned on.

U.S. Pat. No. 3,035,614 discloses expansion tanks which include a pair of hollow body members, each of which have an end and a tubular skirt portion. The skirt portions are united in end-to-end relation to form a tank. There is a flexible diaphragm in and spanning the tank and having a peripheral portion in peripheral engagement with the skirt of one of the body members. A continuous retaining ring engages the peripheral portion and retains it in engagement with the skirt of the body member. There is a groove in the exterior of the ring and a substantially complemental corrugation in the skirt of the body member compressing the peripheral portion into the groove to secure the diaphragm against movement endwise of the tank and seal the diaphragm to the skirt. See also U.S. Pat. No. 2,695,753.

U.S. Pat. No. 3,524,475 discloses expansion tanks which include a hollow body having a side wall and end walls and a liquid-impervious liner having an end wall and a side wall covering the corresponding end wall and a portion of the side wall of the body in adjacent non-adhering relation thereto. The liner has a peripheral edge portion contacting the side wall. There is a flexible diaphragm dividing the interior of the body into two sections. One of the sections is adapted to receive a liquid. The diaphragm has a peripheral portion disposed in overlying relation to the peripheral edge portion of the liner. There is also means retaining the peripheral portions of the diaphragm and the liner against the side wall to form a liquid-tight seal between the peripheral portions of the diaphragm and the liner. The retaining means includes a continuous ring engaging and receiving the peripheral portion of the diaphragm. The side wall engages the peripheral edge portion of the liner. The ring and wall have a complemental rib and groove securing the diaphragm to the side wall. The diaphragm is formed with a bead on its peripheral portion, with the bead being received between the rib and the groove.

BROAD DESCRIPTION OF THE INVENTION

An object of the invention is to provide an improved storage device in the form of an expansion tank, for use in hot water heating systems, or pressurized water systems, which has a diaphragm which divides the tank into two sections. Other objectives and advantages of the invention are set out herein or are obvious or apparent herefrom to one skilled in the art.

The objectives and advantages of the invention are achieved by the devices, apparatus and methods of the invention.

The invention involves an improved storage device in the form of an expansion tank, for use in hot water heating systems, or pressurized water systems, which expansion tank has a diaphragm which divides the tank into two sections. One section is precharged with gas under pressure. The other section is connected to the hot water heating system.

More specifically, the invention involves expansion tanks which include a pair of hollow body members. Each hollow body member has an end wall and a tubular side wall having an end portion. The end portions of the side walls are in end to end relation. There is a continuous retaining ring having a first peripheral portion and a second peripheral portion. The end portions of the side walls are united to the first peripheral portion so as to form a tank. The second peripheral portion is located interior to the first peripheral portion. There is also a flexible diaphragm in and spanning the tank and having a peripheral portion in peripheral engagement with the end portion of the side wall of one of the hollow body members. The second peripheral portion of the retaining ring engages and holds the peripheral portion of the diaphragm in peripheral engagement with the side wall.

Preferably the retaining ring is composed of a weldable grade of steel. Preferably the first peripheral portion of the retaining ring has an outward extending peripheral protrusion which aligns with the end portions of the side walls of the hollow body members. Preferably the outward extending peripheral protrusion is a continuous outward extending peripheral rib. Preferably the end region of the diaphragm has a continuous outward facing bead, the end portion of the side wall of one of the hollow body members has a continuous inward facing groove which corresponds with the outward facing bead of the diaphragm, and the second peripheral portion of the retaining ring has a continuous outward facing groove which corresponds and mates with the outward facing bead of the diaphragm, thereby securing the diaphragm and liner to the side wall in a liquid-tight sealing manner. Preferably a liquid-impervious liner having an end wall and a side wall disposed in adjacent non-adhering relation to the end wall and the portion of the side wall of the tank enclosing the liquid-receiving section for covering the interior surfaces of the portion of the tank enclosing the liquid-receiving section, is located between the diaphragm and the lower hollow body member, thereby the diaphragm and the liner prevents the liquid from contacting the tank walls.

Some of the features and advantages of the improved expansion tanks of the invention are: The retaining ring is located in assembly position without the need for gauges. The retaining ring preferably has an outward groove on its cylindrical section that controls the position of the diaphragm bead assembly location—such case, the retaining ring cannot move out of position during the forming of the groove in the outer cylindrical surface of the dome of during the operation of the expansion tank. The retaining ring positions the two dome halves without the need for one of the domes to be stepped inwardly (lipped). The retaining ring preferably has an outward bead to separate the two domes sufficiently to provide for welding. The retaining ring becomes a strength reinforcement and an integral part of the tank after it is welded. The retaining ring preferably is made of a weldable grade of steel.

The present invention is an improvement of the expansion tank disclosed in U.S. Pat. No. 3,524,475 (Kirk, Jr.) wherein the retaining ring that continuously engages the diaphragm and liner to perform a secure seal has been modified as described herein.

The invention also involves a continuous retaining ring having a first peripheral portion and a second peripheral portion. The second peripheral portion is located internal of the first peripheral portion by means of a slanted intermediate portion. The first peripheral portion has an outward extending peripheral protrusion. The second peripheral portion has a inward facing peripheral groove.

The invention further involves the method of assemblying the invention expansion tank.

DETAILED DESCRIPTION OF THE INVENTION

The invention expansion tank is provided with a deformable diaphragm to divide the tank into two sections. One section is precharged with gas under pressure so that the diaphragm is displaced to increase or decrease the volume of this section according to the variations of the volume of water in the other section. When the expansion tank is incorporated in a hot water heating system, the variation in volume is caused when the boiler water is heated and cooled in the normal cyclic operation of the heating system. If the expansion tank is a part of a water system, the variation in volume occurs as tap water is drawn and when the pump operates to replace the water drawn from the tank. The diaphragm separates the gas in the one section of the tank from the water in the system.

There may be a corrosion problem which significantly limits the useful life of the expansion tanks. This is due to the contact of water (or water vapor) with substantially the entire inner surface of the water-receiving section (of carbon steel, for example) of the expansion tanks. Corrosion is active in hot water heating system expansion tanks, because of the elevated temperature of the water. With water system expansion tanks, the corrosion varies in accordance with the mineral content of the water in a given locality.

In accordance with a preferred embodiment of the invention, the expansion tank of the diaphragm type in which the inner surface of the portion of the tank defining the water-receiving section is covered with a water impervious liner. The liner itself is best fabricated in a separate operation before being installed in the tank. This permits the manufacture of a liner of the desired quality and thickness at a considerable saving as compared with a liner formed on the interior tank surface by a coating process. It would be difficult and expensive both to apply a liner coating as well as to determine whether the deposited liner is of the desired thickness and integrity.

The water is thus contained between the liner and the diaphragm so that the entire interior of the expansion tank is shielded from the water. As a result, corrosion of the tank is prevented regardless of the type of water with which the tank is used or of the temperature experienced within the practical limits of operation of hot water heating systems. This permits the tank to be constructed of any desired material, without regard to the effect of water on that material.

Figure 1:
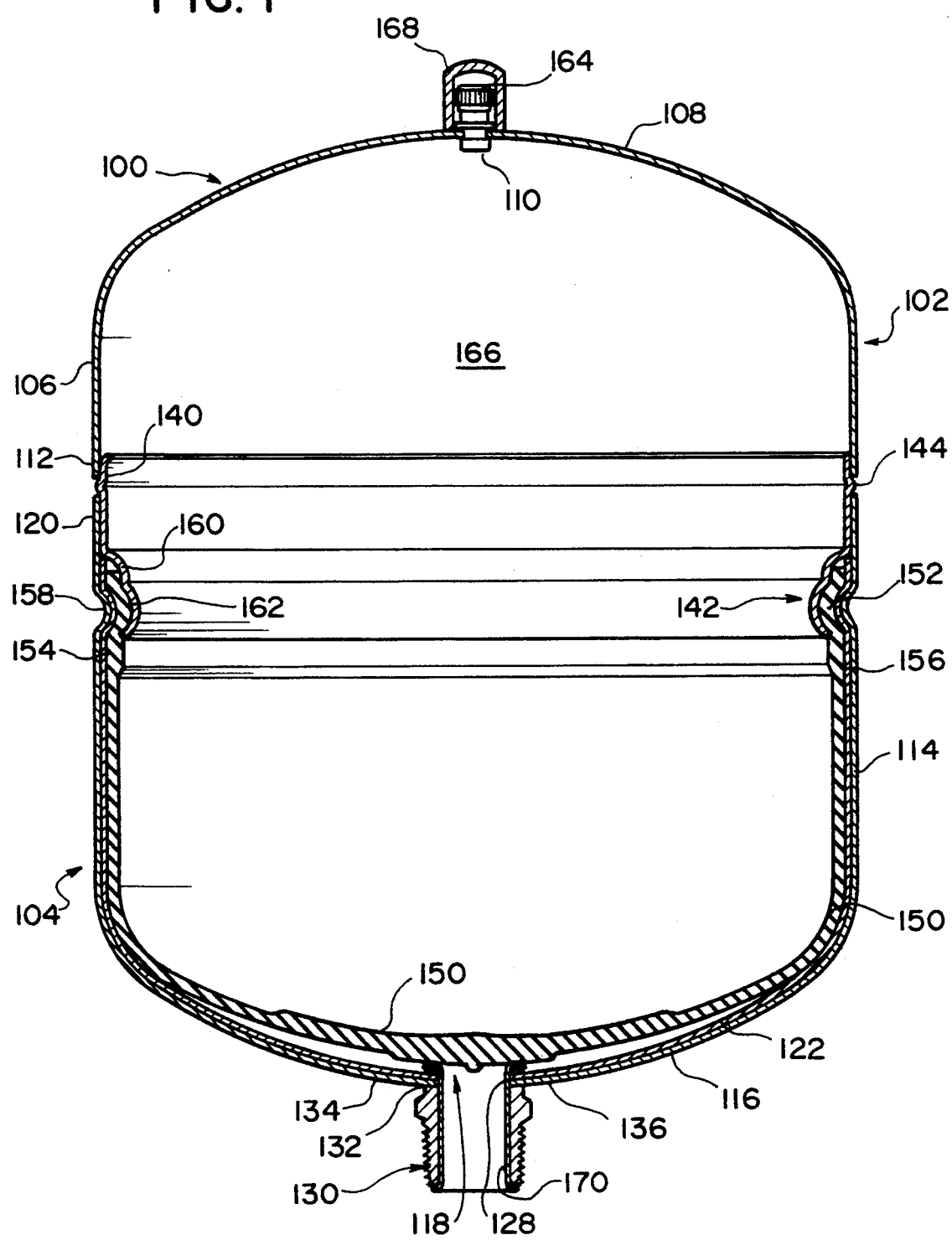
FIG. 1 is a vertical cross-sectional view of an expansion tank of the invention.

Referring to FIG. 1, expansion tank 100 includes upper cylindrical body 102 and lower cylindrical body 104. Upper cylindrical body 102 has side wall 106 and end wall 108 which is provided with orifice 110. End 112 of side wall 106 preferably is not an offset edge as in U.S. Pat. No. 3,524,475. Lower cylindrical body 104 has side wall 114 and end wall 116 which is provided with orifice 118. End 120 of side wall 114 preferably is not an offset edge.

The interior surface of the lower end wall 114 and of the lower portion of the lower side wall 116 are covered by a liquid-impervious liner 122, which is composed preferably of a plastic capable of withstanding temperatures of at least 212° F., such as, polypropylene, so that the water of a hot water heating system or a pressurized well water system is separated from the interior surfaces of the portion of tank 102 defining bottom section 104 thereof, this being the section that contains the water. Also, plastic liner 122 will not deteriorate due to the temperature or type of water with which tank 100 is used. Liner 122 itself can be manufactured by any suitable technique known to the art; such as, vacuum forming, injection molding, etc.

The plastic liner 122 is formed with an orifice 128 which mates with orifice 118 in end wall 116 of lower cylindrical body 104. The portion of liner 122 adjacent the orifice is clamped to lower end wall 116, welded, brazed or otherwise suitably connected to tank 100 at 132 and adapted to connect expansion tank 100 with the water system of which it forms a part. Insert 170 which mates with orifice 118 of fitting 130 is formed with upwardly extending lip 134, which is adapted to be rolled over to clamp O-ring seal 136, which is preferably of an elastomeric material such as rubber. Insert 170 is attached to fitting 130 and end wall 116 by brazing. O-ring 136 is compressed between the lip 134 and liner 122, and provides a liquid-tight seal therebetween, thus preventing water in expansion tank 100 from escaping through orifice 128 of plastic liner 122 exteriorly of fitting 130. Thus, O-ring 136 and bonded joint 132 provide a double seal between tank 100 and fitting 130. Bonded joint 132 also seals insert 170 to fitting 130 precluding leakage by the orifice 118/insert 170 interface.

Figure 2:
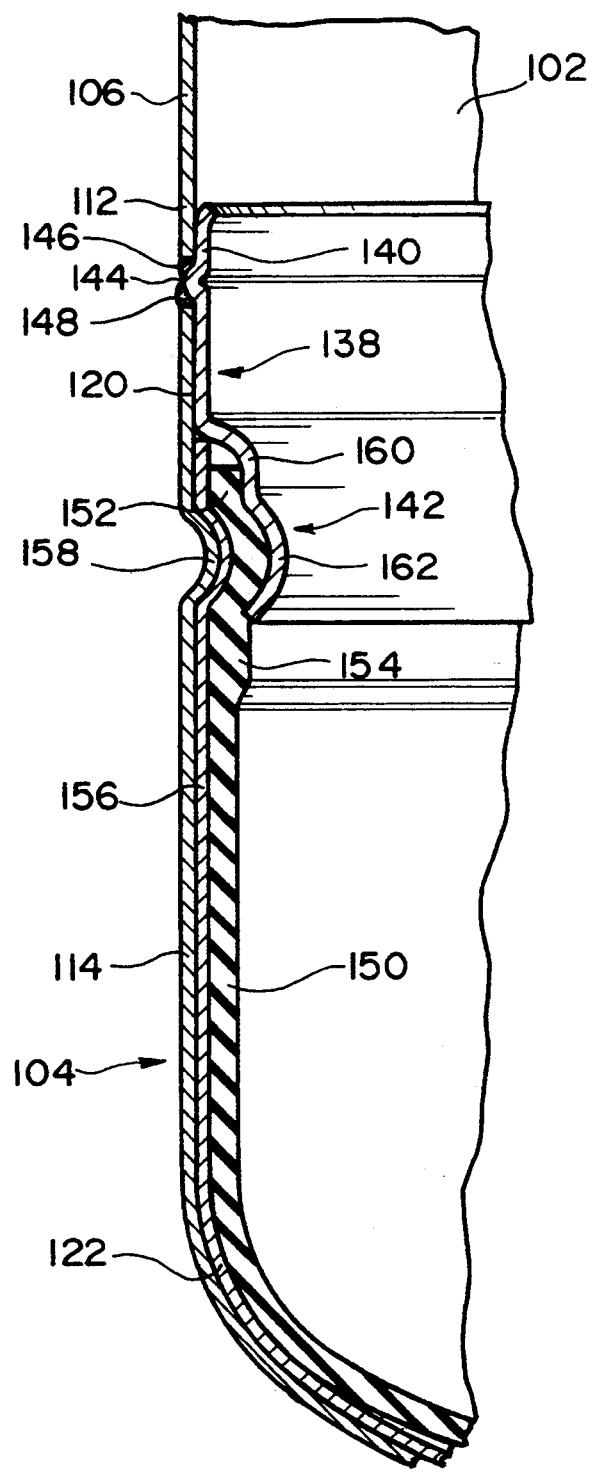
FIG. 2 is an enlarged vertical partial cross-sectional view of the expansion tank, including the retaining ring, of FIG. 1.

Retaining (or clamp) ring 138 has upper portion 140 and lower portion 142. (See FIG. 2.) Upper portion 140 of retaining ring has bead (or internally facing groove) 144. End 112 of side wall 106 fits tightly over the region of upper portion 140 above bead 144. End 120 of side wall 114 fits tightly over the lower portion 142 below bead 144. Ends 112 and 120 are welded to retaining ring 138 at the interface regions 146 and 148.

Flexible diaphragm 150, formed of butyl rubber or other elastomer, is disposed inside of lower cylindrical body 104 and is adapted to conform to the shape thereof. Diaphragm 150 has an inward protruding bead (or groove) 152 on the interior surface thereof adjacent its free edge 154. Diaphragm 150 is so situated that its free edge 154 is adjacent the upper free edge 156 of the liner 122. Inward protruding bead (groove) 158 in side wall 114 corresponds to and mates with bead 152 of diaphragm 150. Lower portion 142 of retaining ring 138 contains inward slanted portion 160 and outward facing concave portion 162. Concave portion 162 corresponds to and mates with bead 152 of diaphragm 150. In this manner, the upper ends of line 122 and diaphragm 150 are anchored to lower cylindrical body 104.

Conventional air check valve 164, secured in orifice 110 in the upper cylindrical body 102, permits air under pressure to be introduced into the gas receiving section 166 between the diaphragm 150 and upper cylindrical body 102. After the pressure in section 166 is raised to the desired value, valve 164 is covered with seal 168.

The expansion tank (100) according to the present invention can be assembled as follows. Fitting 130 and insert 170 is brazed or welded at 132 to lower end wall 116. Plastic liner 122 is then placed on the interior surface of lower cylindrical body 104, orifice 128 being slipped over insert 170. Next, O-ring 136 is stretched over insert 170, which is then rolled over O-ring 136 to compress it and liner 122 adjacent lower cylindrical body 104.

Diaphragm 150 is placed over liner 122 with bead 152 mating with lower dome 104. Upper edge 120 of lower dome 104 is forced into fit with the region of upper portion 140 of retaining ring 138 below bead 144. At the same time, concave portion 162 of lower portion 142 of retaining ring 138 forcefully fits over bead 152 of diaphragm 150. The invention design has an inwardly protruding groove 158 that at assembly compresses the diaphragm bead between bottom dome side wall surface 104 and retaining ring 138. This compression on the diaphragm bead occurs prior to assemblying the upper dome. The "C" shape contour of the ring holds the diaphragm bead in place.

Preferably, bead 144 is mated up to end 120 of side wall 114. This automatically sets the location of diaphragm bead 152 and the mating concave section 162 of ring 138. After liner 122 is in place, ring 138 is inserted into diaphragm 150 until continuous concave groove 162 of ring 138 is seated in bead section 162 of diaphragm 150. Diaphragm 150 and ring 122 are then inserted into the open end of water dome 104. Unlike the prior ring designs that requires gauges to position it, new ring 138 has continuous bead 144 formed in upper portion 140.

Diaphragm, liner retaining ring 138 and lower dome 104 are then put on a grooving machine and groove 158 is formed into the dome, squeezing the diaphragm.

Lower edge 112 of upper dome is then forced into fit with the region of upper portion 140 of retaining ring 138 below bead 144. Lower edge 112 and upper edge 120 are welded (preferred), brazed or soldered to bead 144 at 146 and 148, respectively. The welding areas are sufficiently spaced from diaphragm 152 and liner 122 so as not to damage them by heating during the welding operation.

Air under pressure can be introduced through air check valve 164 until the pressure in gas-receiving section 166 reaches 18 pounds per square inch, for example, and seal 168 is pressed over valve 164 to protect it.

The pertinent portions of U.S. Pat. Nos. 3,524,475, 3,035,614 and 2,695,753, particularly the portions regarding expansion tanks, retaining rings and assembly methods, are incorporated herein by reference.

Figure 3:
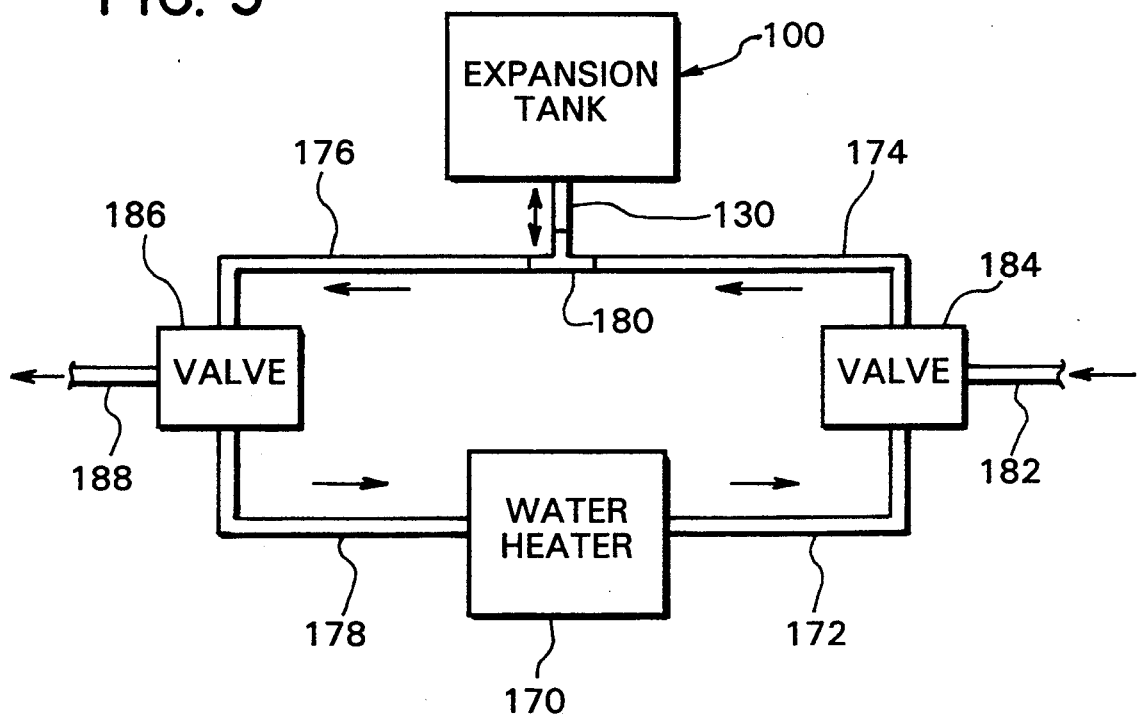
FIG. 3 is a schematic diagram of a combination of a hot water heating system and the expansion tank of FIG. 1.

In FIG. 3, heated water exits water heater 170 via line (pipe) 172 and continues through line (pipe) 174, 176. The water returns via line (pipe) 178 to water heater 170. Expansion tank 100 is located in line 174, 176 by means of nipple 130 and tee 180. Pressurized water can be put into the line 172, 174, 176, 178 via line (pipe) 182 and valve 184 (located in line 174,176). Valve or faucet 186 is located in line 176, 178. Hot water can be withdrawn via line 188 (and valve 186). Valve 186 and line 188 can be replaced by a hot water radiator (not shown). Water flow is shown by the arrows in the figure.

Figure 4:
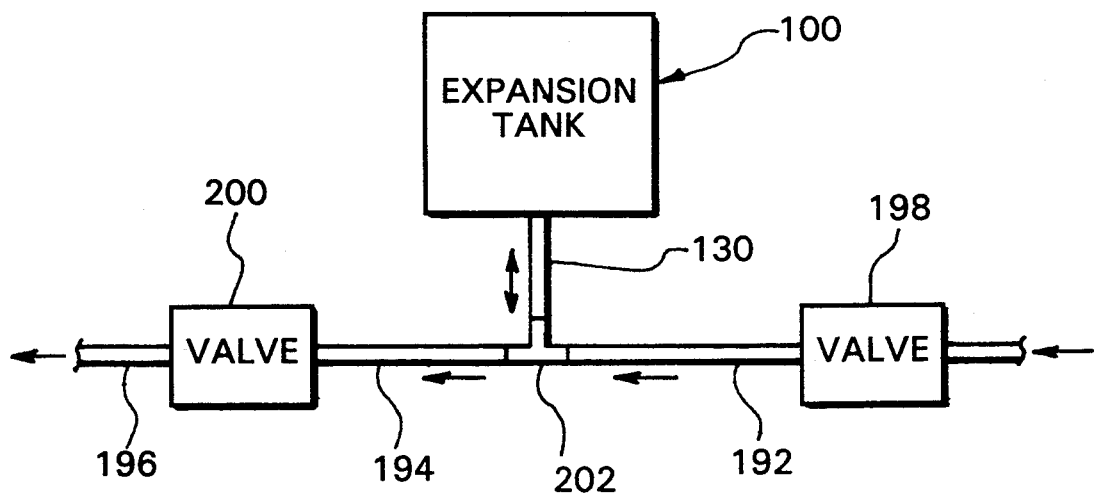
FIG. 4 is a schematic diagram of a combination of a pressurized water system.

In FIG. 4, pressurized water flows through line 190, 192, 194, 196. Valve 198 is located in line 190, 192 and valve or faucet 200 is located in line 194,196. Water flow is shown by the arrows in the figure. Expansion tank 100 is located in line 192, 194 by means of nipple 130 and tee 202.

The present method of securing a ring, the diaphragm and the liner by deforming the outer surface of dome remains the same as depicted and described in U.S. Pat. No. 3,035,614. Unlike the patent, however, mating section 140 of ring 138 to diaphragm bead 152 is the sealing surface requiring that this surface be smooth and free of surface defects.

Unlike the design disclosed in the above-mentioned patents, the present invention's ring 138 has a cylindrical section 140 that has, as part of its surface, a continuous bead 144 that mates to the open end of dome 104. Dome 104's open end does not have to be deformed inwardly (commonly referred to as lipping) as required in the above-mentioned patents. Second dome 102 slides onto ring portion 140 until it reaches the bead 144 of ring 138. Domes 102 and 104 are separated by bead 144 of ring 138 and assembled for welding. Bead 144 of ring 138 provides the necessary spacing while the cylindrical surface 140 of ring 138 provides the backing to facilitate the dome positioning and welding.

What is claimed is:

1. An expansion tank comprising:
a pair of hollow body members, each hollow body member having an end wall and a tubular side wall having an end portion, said end portions of the tubular side walls being in end to end relation;

a continuous retaining ring having a first peripheral portion and a second peripheral portion, said end portions of the tubular side walls being united to said first peripheral portion so as to form a tank, said second peripheral portion being located interior to said first peripheral portion, the first peripheral portion of the retaining ring having an outward extending peripheral protrusion which aligns with the end portions of the tubular side walls of the hollow body members, said outward extending peripheral protrusion not being a weld; and a flexible diaphragm in and spanning said tank and having a peripheral portion in peripheral engagement with the end portion of the tubular side wall of one of the hollow body members, the second peripheral portion of the retaining ring engaging and holding the peripheral portion of the diaphragm in peripheral engagement with said side wall, the end region of the diaphragm having a continuous bead, said end portion of the tubular side wall of one of the hollow body members having a continuous outward facing groove which corresponds with said bead of the diaphragm, and the second peripheral portion of the retaining ring having a continuous outward facing groove which corresponds and mates with said bead of the diaphragm, thereby securing the diaphragm and a liner to the tubular side wall in a liquid-tight sealing manner.

2. The expansion tank of claim 1 wherein the groove in the lower hollow body member is formed after assembly of the diaphragm and retaining ring.

* * * * *